United States Patent
Cela et al.

(10) Patent No.: US 10,630,654 B2
(45) Date of Patent: Apr. 21, 2020

(54) HARDWARE-ACCELERATED SECURE COMMUNICATION MANAGEMENT

(71) Applicant: Microsoft Technology Licensing, LLC, Redmond, WA (US)

(72) Inventors: Carlos Jose Cela, Seattle, WA (US); Ho Yuen Chau, Bellevue, WA (US); Bryan William Tuttle, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 284 days.

(21) Appl. No.: 15/630,476

(22) Filed: Jun. 22, 2017

(65) Prior Publication Data

US 2018/0278588 A1 Sep. 27, 2018

Related U.S. Application Data

(60) Provisional application No. 62/475,159, filed on Mar. 22, 2017.

(51) Int. Cl.
*H04L 29/06* (2006.01)
*G06F 21/72* (2013.01)
(Continued)

(52) U.S. Cl.
CPC .......... *H04L 63/0435* (2013.01); *G06F 21/72* (2013.01); *H04L 9/0841* (2013.01); *H04L 9/3242* (2013.01); *H04L 63/0227* (2013.01); *H04L 63/0245* (2013.01); *H04L 63/0263* (2013.01); *H04L 63/0485* (2013.01); *H04L 63/061* (2013.01); *H04L 63/1441* (2013.01); *H04L 63/166* (2013.01); *H04L 63/18* (2013.01);
(Continued)

(58) Field of Classification Search
CPC combination set(s) only.
See application file for complete search history.

(56) References Cited

U.S. PATENT DOCUMENTS 5,594,869 A 1/1997 Hawe et al.
5,870,474 A 2/1999 Wasilewski et al.
(Continued)

OTHER PUBLICATIONS

"International Search Report and Written Opinion Issued in PCT Application No. PCT/US2018/022123", dated May 24, 2018, 14 Pages.
(Continued)

*Primary Examiner* — Ayoub Alata
(74) *Attorney, Agent, or Firm* — Liang IP, PLLC

(57) ABSTRACT

Computing systems, devices, and associated methods of managing secure communication using hardware accelerators are disclosed herein. In one embodiment, a method includes receiving messages from a peer computing device via a computer network at a FPGA of a hardware accelerator and examining each of the received messages to determine whether the received messages contain application data. The method can then include forwarding a first subset of the received messages that do not contain application data to the processor for further processing and processing a second subset of the messages containing application data according to a security protocol without forwarding the second subset to the processor to reduce a consumption of bandwidth across the communications bridge.

19 Claims, 13 Drawing Sheets

(51) Int. Cl.
  *H04L 9/08*   (2006.01)
  *H04L 29/08*  (2006.01)
  *H04L 9/32*   (2006.01)

(52) U.S. Cl.
  CPC .............. *H04L 67/02* (2013.01); *H04L 69/12* (2013.01); *H04L 69/22* (2013.01); *H04L 63/0209* (2013.01); *H04L 63/14* (2013.01); *H04L 2209/12* (2013.01)

(56) References Cited

U.S. PATENT DOCUMENTS

| | | | | |
|---|---|---|---|---|
| 6,657,956 | B1* | 12/2003 | Sigaud | H04L 67/14 370/230 |
| 9,515,658 | B1* | 12/2016 | Chen | H03K 19/17756 |
| 9,930,067 | B1* | 3/2018 | Johansson | H04L 63/166 |
| 10,218,682 | B1* | 2/2019 | Kawach | H04L 63/0428 |
| 2003/0023767 | A1 | 10/2003 | Brabson et al. | |
| 2008/0046727 | A1 | 2/2008 | Kanekar et al. | |
| 2011/0258432 | A1 | 10/2011 | Rao et al. | |
| 2014/0304498 | A1 | 10/2014 | Gonuguntla et al. | |
| 2017/0013015 | A1 | 10/2017 | Dinha et al. | |
| 2018/0278583 | A1 | 9/2018 | Cela | |

OTHER PUBLICATIONS

"Non Final Office Action Issued in U.S. Appl. No. 15/632,865", dated May 16, 2019, 9 Pages.

The SSL Performance Myth | MaxCDN Blog; Feb. 19, 2015 by Robert Gibb—The SSL Performance Myth, and Tips for Making Secure Connections Fast; https://www.maxcdn.com/blog/ssl-performance-myth/.

"Notice of Allowance Issued in U.S. Appl. No. 15/632,865", dated Sep. 11, 2019, 8 Pages.

\* cited by examiner

HARDWARE-ACCELERATED SECURE COMMUNICATION MANAGEMENT

CROSS-REFERENCE TO RELATED APPLICATION(S)

This application claims priority to U.S. Provisional Application No. 62/475,159, filed on Mar. 22, 2017, the disclosure of which is incorporated herein in its entirety.

BACKGROUND

In computing, hardware acceleration generally involves using hardware circuits to perform functions more quickly and efficiently than executing software on general purpose processors. Examples of hardware acceleration include acceleration of bit block transfers in graphics processing units and regular expression for spam control in servers. Hardware devices that perform such acceleration are referred to as hardware accelerators when being separate from a central processing unit ("CPU") in a computer. Example hardware accelerators include cryptographic accelerators, video processors, 3D graphics accelerators, artificial intelligence accelerators, regular expression accelerators, etc.

Hardware accelerators can be implemented as Application Specific Integrated Circuits ("ASICs") that are customized during fabrication for desired uses or Field-Programmable Gate Arrays ("FPGAs") that are configurable by a user after manufacturing. FPGA configuration can be specified using a hardware description language similar to that used for ASICs. FPGAs typically include an array of logic blocks and a hierarchy of reconfigurable interconnects that allow the logic blocks to be "wired together" like logic gates. As such, a user can configure logic blocks in FPGAs to perform complex combinational functions, or merely simple logic operations to synthesize equivalent functionality executable in hardware at much faster speeds than in software.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Certain hardware acceleration implementations involve using Secure Sockets Layer ("SSL") or Transport Layer Security ("TLS") protocol to secure data streams passing through hardware accelerators. For example, during a secured Hypertext Transfer Protocol ("HTTPS") communications session, hardware accelerators may be utilized to process encrypted data streams between a sender (e.g., a server) and a receiver (e.g., a client device) or vice versa. The secure communications session can be established by first negotiating encryption and other parameters/algorithms between the sender and the receiver. Upon mutual agreement, a connection is instantiated within the session, and the sender and receiver can then encrypt and decrypt data with the mutually agreed security parameters/algorithms and exchange secured data between the sender and the receiver.

Negotiation operations for establishing a secure communications channel (e.g., a session utilizing an associated connection) can be complex. Example negotiation operations start with a handshake stage that can include exchange of certificates and a compression method, cipher suite negotiation, authentication, key exchange, etc. Such complexity can render FPGAs (or other suitable types of programmable hardware circuitry) unsuitable for supporting a complete security protocol in hardware. Synthesized circuits in FPGAs for implementing session negotiation may be too large to be practical. As such, an accelerator processor external to a FPGA is often relied upon for handling negotiation operations during establishment of a secure communications channel. The FPGA, on the other hand, may only handle isolated aspects of data transmission for already established secure communication connections, such as TCP/IP and symmetric cryptography operations.

The foregoing limitations of the FPGA may force incoming/outgoing data to go through the accelerator processor for encryption/decryption or other suitable secured data operations during application data processing. As such, overhead of data transfer over a communications bridge (e.g., a Peripheral Component Interconnect Express bridge or "PCIe" bridge) between the FPGA and the accelerator processor may be high. The communications bridge can become a bottleneck because each byte of incoming/outgoing data is transmitted across the communications bridge every time encryption/decryption is needed. In many applications (e.g. video or audio filtering, encoding, or processing), data is typically streamed in, processed, and then streamed out. For such applications, securing the data with SSL/TLS can impose a large overhead in terms of bandwidth over the communications bridge, and thus limiting data throughput of the hardware accelerator.

Several embodiments of the disclosed technology can address at least some of the foregoing difficulties by switching data traffic between the accelerator processor external to the FPGA and a session handler implemented in the FPGA based on types of data carried by the secured data traffic. In certain embodiments, a data router can be implemented in the FPGA of the hardware accelerator to switch data traffic by monitoring a value in the header of a received TLS record assembled from packets associated with a secured communication channel. When the TLS record header contains a value (e.g., APPLICATION_DATA) indicating that the received TLS record contains encrypted application data, the data router can divert the received TLS record to the session handler in the FPGA instead of the accelerator processor.

On the other hand, when the TLS record header contains other values (e.g., CHANGE_CIPHER_SPEC, ALERT, or HANDSHAKE) indicating that the received TLS record contains control data for the secure communications session or connection, the data router redirects the TLS record to the accelerator processor for handling. In other embodiments, the data router can be configured to detect establishment of the secure communications channel by, for example, monitoring for a server/client finished message or via other suitable techniques. In further embodiments, the data router may be combined with the session handler, may include a separate routing device, or may have other suitable configurations.

During initial establishment of a SSL/TLS communications channel with a peer computing device, the data router can be configured to assemble packets into one or more TLS records and route the TLS records containing control data to the accelerator processor. The control data can be related to, for instance, negotiation of cipher suites, authentication of the peer computing device, exchange of random numbers and a pre-master secret, creation of a shared secret key, or other suitable session-establishment operations. The accelerator processor can then process the received TLS records to facilitate handshake, change cipher specification, alert, or other suitable types of operations utilizing SSL/TLS libraries to establish the requested secure communications channel. For example, the accelerator processor can be configured to choose a common cipher suite including a key exchange method, a bulk encryption method, or a message authentication code. The accelerator processor can also be configured to authenticate the peer computing device, perform key exchange, and indicate completion of session establishment.

Once the secure communications channel is established, the accelerator processor can be configured to provide session and connection information to the session handler and/or a crypto kernel in the FPGA. Such session information can include, for instance, a session identification, a session secret key, a cryptographic algorithm identification, a hash algorithm identification, a compression algorithm identification, or other suitable parameters or algorithm identifications. In certain embodiments, the accelerator processor can also be configured to indicate to the data router whether data routing is to be performed for the established secure communications channel. In other embodiments, the data router can be configured to perform data routing for all SSL/TLS sessions and/or connections.

When the data router detects a sequence of packets containing a TLS record (or "message") with encrypted application data, the data router can then route the received TLS record to the session handler for further processing. The session handler can be configured to transparently handle a subset of an SSL/TLS protocol such as a record layer sub-protocol (or a portion thereof). For example, using the session information received from the accelerator processor, the session handler can fragment/combine the received packets into a desired data structure, number a sequence of data blocks in the data stream, compress/decompress data in the packets using the compression algorithm negotiated during handshake, or perform other suitable data operations. In a particular example, the session handler can be configured to decrypt a data stream related to a video stream and forward the decrypted data stream to a video transcoder implemented in the FPGA for fast processing.

During application data transmission and/or processing, the data router may detect that certain TLS records do not contain application data. For instance, the peer computing device may initiate a re-negotiation process for the established SSL/TLS communications session by transmitting a suitable session management command. In certain embodiments, in response to receiving such a command, the data router can be configured to route the TLS record related to the session management command to the accelerator processor instead of the session handler implemented in the FPGA. In turn, the accelerator processor can facilitate the requested re-negotiation process by accessing the SSL/TLS library, perform the re-negotiation with the peer computing device, and indicate success/failure of the re-negotiation. Subsequent to a successful completion of the re-negotiation process, the accelerator processor can be configured to transmit updated session and/or connection information to the session handler, the data router, and/or the crypto kernel. As such, the session handler can continue process packets containing application data for the established SSL/TLS communications session or connection. Upon completion of the secure communications session, the SSL/TLS session can be closed on both the accelerator processor and the FPGA.

Several embodiments of the disclosed technology can thus reduce or even prevent overloading the communications bridge between the FPGA and the accelerator processor. As described above, by implementing the session handler in the FPGA to handle application data processing, encryption/decryption of any application data in a data stream would not leave the FPGA and cross the communications bridge to the accelerator processor. Thus, from the accelerator processor's perspective, the communications session appears as if the communications session never receives any application data, yet the communications session remains valid. From the perspective of the FPGA, the communications session appears as if a secured connection for the session is initiated without any handshaking overhead. As such, overhead in terms of data transfer over the communications bridge between the FPGA and the accelerator processor can be reduced to enable higher throughput levels (e.g., greater than 10 gigabit/second) at the hardware accelerator when compared to other hardware accelerators.

DETAILED DESCRIPTION

Figure 1:
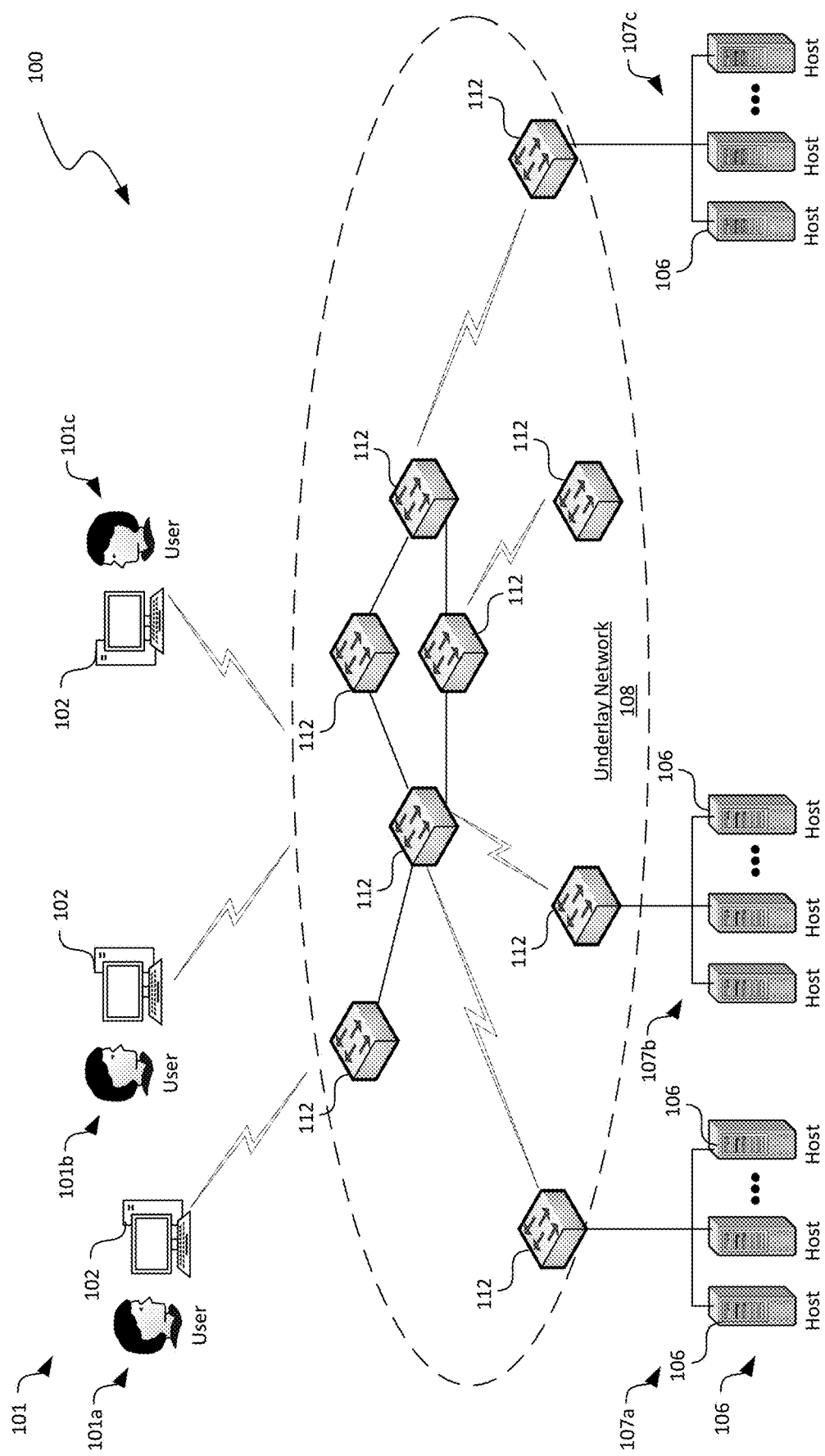
FIG. 1 is a schematic diagram of a distributed computing system implementing secure communication management in accordance with embodiments of the disclosed technology.

Certain embodiments of computing systems, devices, components, modules, routines, and processes for facilitating secure communication management in hardware accelerators are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-10.

As used herein, the term a "distributed computing system" generally refers to a computer network having a plurality of network devices that interconnect a plurality of servers or hosts to one another or to external networks (e.g., the Internet). The term "network device" generally refers to a physical network device, examples of which include routers, switches, hubs, bridges, load balancers, security gateways, or firewalls. A "host" generally refers to a computing device configured to implement, for instance, one or more virtual machines or other suitable virtualized components. For example, a host can include a server having a hypervisor configured to support one or more virtual machines or other suitable types of virtual components.

A computer network can be conceptually divided into an overlay network implemented over an underlay network. An "overlay network" generally refers to an abstracted network implemented over and operating on top of an underlay network. The underlay network can include multiple physical network devices interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can have one or more tenant end points ("TEPs"), for example, virtual machines. The virtual networks can interconnect multiple TEPs on different hosts. Virtual network devices in the overlay network can be connected to one another by virtual links individually corresponding to one or more network routes along one or more physical network devices in the underlay network.

Also used herein, the term "secure communications" generally refers to an exchange of encrypted or protected data against unauthorized interceptions and/or access. In certain embodiments, SSL/TLS protocols can be applied to secure exchange of data. In other embodiments, secure communication can be achieved by implementing other suitable techniques. The term "programmable hardware circuitry" generally refers to a hardware circuit device having configurable logic blocks, switches, or other suitable components. One example programmable hardware circuitry can be an FPGA with logic blocks configurable to synthesize equivalent functionality executable in hardware at much faster speeds than in software.

A secure communications session or "session" involves a corresponding set of encryption parameters, cipher suite, and other suitable parameters agreed upon between a sender and a receiver. A secure communications session can have one or more connections individually related to TCP/IP or other suitable types of underlying data transport link. A session is needed to open a data connection, and a connection can span multiple sessions (e.g. when a cipher protocol is changed without severing the TCP/IP connection). A session can also have many connections, for example, when using the same encryption parameters to connect two endpoints over multiple TCP/IP connections individually identified by a combination of an IP address and a TCP port. As used herein, a session and one or more corresponding connections can be referred to as a "channel" or "link."

Further, as used herein, the term "application data" generally refers to data that is read, generated, modified, or otherwise processed by a user application. For example, a file or digital stream containing video data can be application data for a video editing application. The video editing application can read the file, modify the video data in the file, and output a new file contain the modified video data. In contrast, the term "session management data" or "session control data" generally refers to data exchanged during and for establishment of a secure communication channel. For example, session management data can include data contained in handshake, authentication, key exchange, session status indication, or other suitable types of messages.

As used herein, a "packet" generally refers to a formatted unit of data carried by a packet-switched network. A packet typically can include user data along with control data. The control data can provide information for delivering the user data. For example, the control data can include source and destination network addresses/ports, error checking codes, sequencing information, hop counts, priority information, security information, or other suitable information regarding the user data. Typically, the control data can be contained in headers and/or trailers of a packet. The headers and trailers can include one or more data field containing suitable information. An example data schema for control data is described in more detail below with reference to FIGS. 5A-5C.

Hardware-accelerated computing can consume and produce large amounts of data. As such, moving data quickly and securely using SSL/TLS or other suitable security protocols to and from a FPGA in a hardware accelerator can be of interest. Implementing SSL/TLS in hardware, however, is challenging due the complexity of the protocols. As such, currently used solutions are inefficient in terms of power consumed and cost of hardware. The disclosed technology allows use of SSL/TLS or other suitable security protocols to securely transfer data to/from a FPGA of a hardware accelerator while maintaining high throughput and relatively low power consumption. In addition, several embodiments of the disclosed technology can also allow using System-on-Chip ("SoC") systems to implement high-throughput hardware accelerators, as described in more detail below.

FIG. 1 is a schematic diagram illustrating a distributed computing system 100 suitable for implementing secure communication management in accordance with embodiments of the disclosed technology. As shown in FIG. 1, the distributed computing system 100 can include an underlay network 108 interconnecting a plurality of hosts 106 and a plurality of client devices 102. The individual client devices 102 can be associated with corresponding users 101a-101c. Even though particular components of the distributed computing system 100 are shown in FIG. 1, in other embodiments, the distributed computing system 100 can also include network storage devices, maintenance managers, and/or other suitable components (not shown) in addition to or in lieu of the components shown in FIG. 1.

The client devices 102 can each include a computing device that facilitates corresponding users 101 to access cloud services provided by the hosts 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable number of users 101 to access cloud or other suitable types of computing services provided by the hosts 106.

The hosts 106 can individually be configured to provide computing, storage, and/or other suitable cloud services to the individual users 101. For example, as described in more detail below with reference to FIG. 2, each of the hosts 106 can initiate and maintain one or more virtual machines 144 (shown in FIG. 2) upon requests from the users 101. The users 101 can then utilize the instantiated virtual machines 144 to perform computation, communication, data storage, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the individual users 101a-101c.

As shown in FIG. 1, the underlay network 108 can include multiple network devices 112 that interconnect the multiple hosts 106 and the client devices 102. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. In the illustrated embodiment, each of the host sets 107a-107c is coupled to corresponding network devices 112a-112c, respectively, which are commonly referred to as "top-of-rack" or "TOR" network devices. The TOR network devices 112a-112c can then be coupled to additional network devices 112 to form a computer network in a hierarchical, flat, mesh, or other suitable types of topology. The underlay network 108 can allow communications among the hosts 106 and the client devices 102. In other embodiments, the multiple host sets 107a-107c can share a single network device 112 or can have other suitable arrangements.

Figure 2:
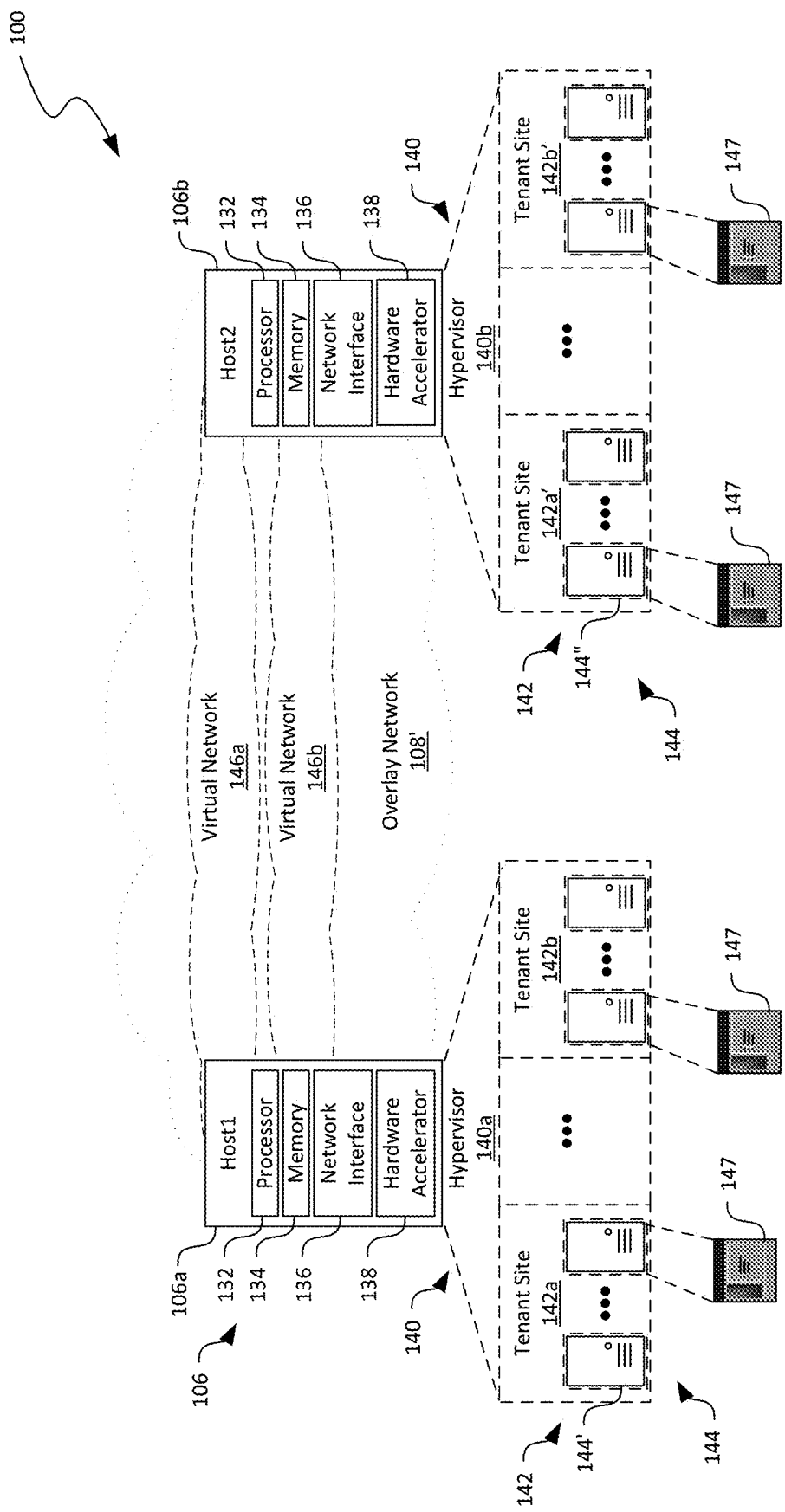
FIG. 2 is a schematic diagram illustrating example hardware/software components of the distributed computing system in FIG. 1 in accordance with embodiments of the disclosed technology.

FIG. 2 is a schematic diagram illustrating certain hardware/software components of the distributed computing system 100 in accordance with embodiments of the disclosed technology. In particular, FIG. 2 illustrates an overlay network 108' that can be implemented on the underlay network 108 in FIG. 1. Though particular configuration and organization of the overlay network 108' is shown in FIG. 2, In other embodiments, the overlay network 108' can also be configured in other suitable ways. In FIG. 2, only certain components of the underlay network 108 of FIG. 1 are shown for clarity.

As shown in FIG. 2, the first host 106a (shown in FIG. 2 as "Host1") and the second host 106b (shown in FIG. 2 as "Host2") can each include a processor 132, a memory 134, a network interface 136, and a hardware accelerator 138 operatively coupled to one another. The processor 132 can include one or more microprocessors and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed herein). The network interface 136 can include a network interface card ("NIC"), a connection converter, and/or other suitable types of input/output devices configured to accept input from and provide output of digital data to other components on the virtual networks 146.

The first host 106a and the second host 106b can individually contain instructions in the memory 134 executable by the processors 132 to cause the individual processors 132 to provide a hypervisor 140 (identified individually as first and second hypervisors 140a and 140b). The hypervisors 140 can be individually configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can also include firmware and/or hardware components.

The tenant sites 142 can each include multiple virtual machines 144 for executing suitable tenant applications 147 of a tenant 101 (FIG. 1). For example, the first host 106a and the second host 106b can both host the tenant site 142a and 142a' for a first tenant 101a (FIG. 1). The first host 106a and the second host 106b can both host the tenant site 142b and 142b' for a second tenant 101b (FIG. 1). Each virtual machine 144 can be executing a corresponding operating system, middleware, and/or suitable applications. The executed applications can each correspond to one or more cloud computing services or other suitable types of computing services.

Also shown in FIG. 2, the distributed computing system 100 can include an overlay network 108' having one or more virtual networks 146 that interconnect the tenant sites 142a and 142b across the first and second hosts 106a and 106b. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks (not shown) may be configured to correspond to a single tenant site 146.

The virtual machines 144 on the virtual networks 146 can communicate with one another via the underlay network 108 (FIG. 1) even though the virtual machines 144 are located or hosted on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146 or the load balancers 113 (FIG. 1). Thus, different virtual networks 146 can use one or more virtual network addresses that are the same. Example virtual network addresses can include IP addresses, MAC addresses, and/or other suitable addresses.

The hardware accelerators 138 can be configured to synthesize and perform certain functions more efficiently than executing corresponding software applications by the processors 132. In certain implementations, a hardware accelerator 138 can include a programmable hardware circuitry operatively coupled to an accelerator processor 150 (shown in FIGS. 3A-4C) via a communications bridge 158 (shown in FIGS. 3A-4C). The programmable hardware circuitry can be configurable by a host (e.g., an operating system, a hypervisor, a virtual machine, or an application) executing on the accelerator processor to process certain incoming/outgoing packets. Suitable programmable hardware circuitry can include field programmable gate array ("FPGA"), application specific integrated circuitry ("ASIC"), or other suitable hardware components. In the illustrated embodiment, the hardware accelerators 138 are shown as being separate from the network interface 136. In other embodiments, the hardware accelerators 138 and the network interface 136 can be integrated into a single component. As described in more detail below with reference to FIGS. 3A-4C, the hardware accelerators 138 can be configured to efficiently facilitate secure communication management via the overlay and underlay network 108 and 108'. Even though the hardware accelerator 138 is described herein as utilized in the context of the hosts 106 in the distributed computing system 100, in other implementations, embodiments of the hardware accelerator 138 can also be used in a standalone server, desktop computer, laptop computer, or other suitable types of computing device.

In operation, the hosts 106 can facilitate communications among the virtual machines 144 and/or tenant applications 147 executing in the virtual machines 144. For example, the processor 132 can execute suitable network communication operations to facilitate the first virtual machine 144' to transmit packets to the second virtual machine 144" or the second host 106b via the virtual network 146a by traversing the network interface 136 on the first host 106a, the underlay network 108 (FIG. 1), and the network interface 136 on the second host 106b. In accordance with embodiments of the disclosed technology, the hardware accelerators 138 can be configured to facilitate operations of secure data transfer at the hosts 106, as described in more detail below.

Figure 3A:
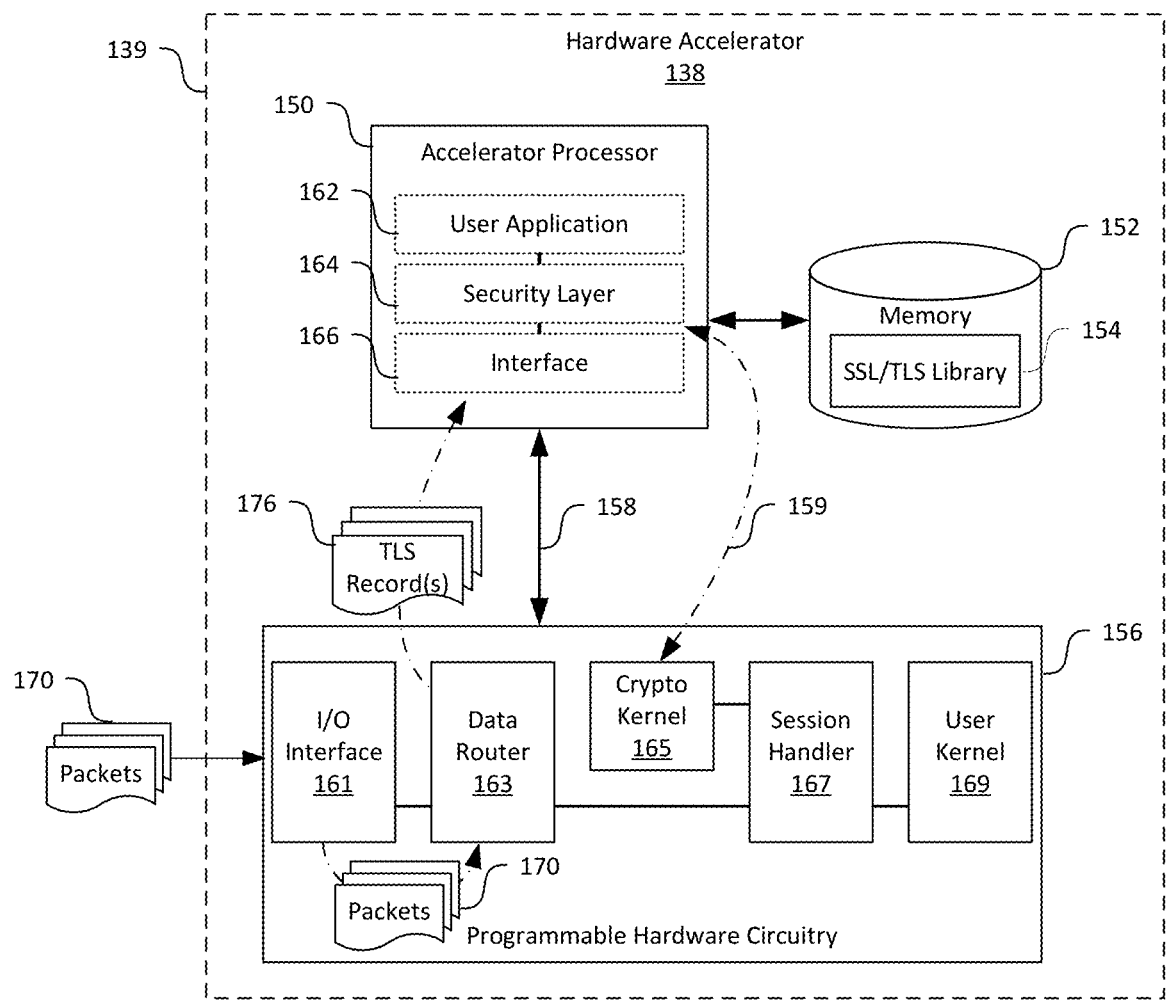
FIGS. 3A-3C are schematic diagrams illustrating certain hardware/software components of a hardware accelerator in FIG. 2 during session establishment in accordance with embodiments of the disclosed technology.
Figure 3B:
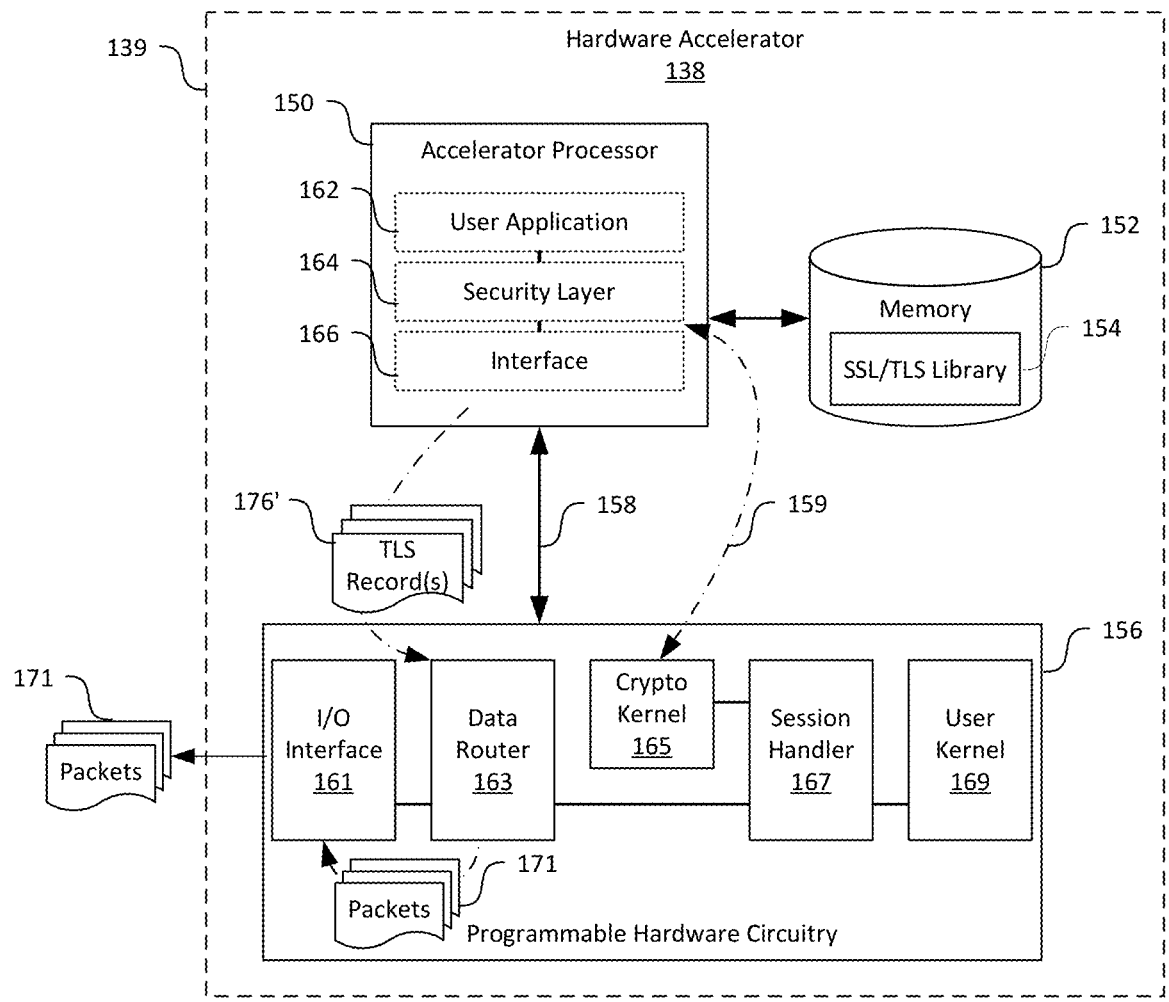
Figure 3C:
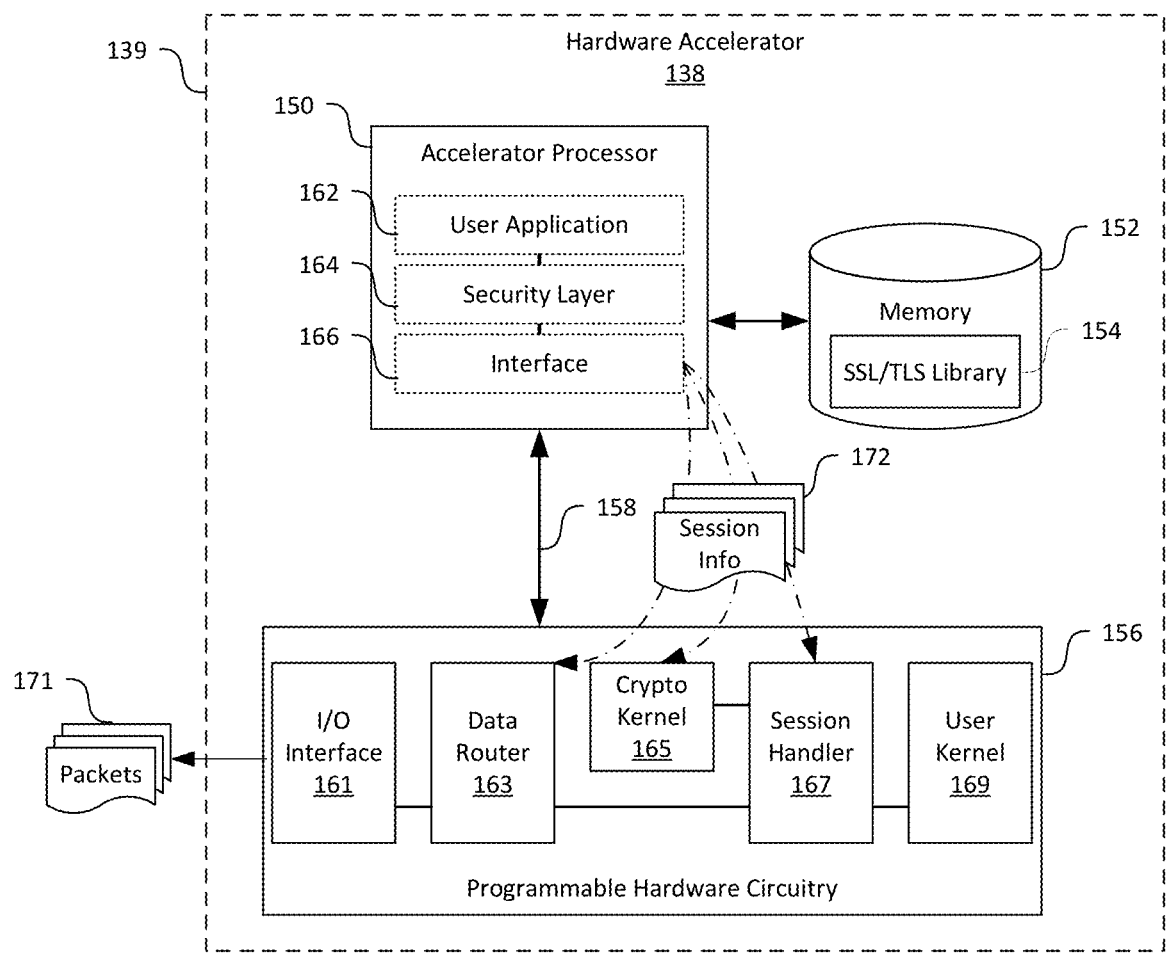

FIGS. 3A-3C are schematic diagrams illustrating certain hardware/software components of a hardware accelerator 138 in FIG. 2 during initial session establishment of a secure communications channel in accordance with embodiments of the disclosed technology. As shown in FIG. 3A, the hardware accelerator 138 can include a printed circuit board 139 (shown in phantom lines for clarity) or other suitable types of substrate carrying an accelerator processor 150, a memory 152, and to a programmable hardware circuitry 156 coupled to the accelerator processor 150 via a communications bridge 158. As such, the accelerator processor 150 is external to the programmable hardware circuitry 156. Though particular components of the hardware accelerator 138 are shown in FIG. 3A, in other embodiments, the hardware accelerator 138 can also include storage components, power components, or other suitable components.

The accelerator processor 150 can include one or more microprocessors and/or other suitable logic devices. The memory 152 can include volatile and/or nonvolatile media (e.g., ROM; RAM, magnetic disk storage media; optical storage media; flash memory devices, and/or other suitable storage media) and/or other types of computer-readable storage media configured to store records of a security protocol library (e.g., the SSL/TLS library 154 shown in FIG. 3A). The memory 152 can also store instructions for the accelerator processor 150 for performing secure communication management, as described in more details below. In other embodiments, the foregoing components of the hardware accelerator 138 may be carried by a single silicon substrate (not shown) to form a SoC device.

The accelerator processor 150 can execute instructions stored in the memory 152 (or other suitable locations) to provide various software components. For example, as shown in FIG. 3A, the accelerator processor 150 can execute instructions to provide a user application 162, a security layer 164, and an interface component 166 operatively coupled to one another. The user application 162 can include any software application configured to perform user desired functions. In one example, the user application 162 can include a video editing application configured to edit a video stream by performing, for instance, transcoding of the video stream or other suitable operations. In other examples, the user application 162 can be a virus scanner, a photo editor, a document editor, or other suitable types of application. The interface component 166 can include suitable software drivers configured to allow the user application 162 and/or the security layer 164 to interact with various components of the programmable hardware circuitry 156 discussed later. Example software drivers can include a processor-FPGA bridge driver, a TCP/IP driver, an accelerated cryptography driver, or other suitable types of drivers.

The security layer 164 can be configured to perform operations related to certain aspects of a security protocol. For example, the security layer 164 can be configured to establish a secure communications channel with a peer computing device (e.g., another host 106 in FIG. 1). The security layer 164 can be configured to handle handshake, change cipher spec, or alert layers of SSL/TLS protocols by accessing the SSL/TLS library 154 in the memory 152. Example operations can include negotiation of cipher suites, authentication of the peer computing device, exchange of random numbers and a pre-master secret, creation of a shared secret key, or other suitable operations. For instance, the security layer 164 can be configured to choose a common cipher suite including a key exchange method, a bulk encryption method, or a message authentication code. The security layer 164 can also be configured to authenticate a peer computing device, perform key exchange, and indicate session establishment complete.

The following is a programming example for using TLS in the security layer 164 to clip values of image pixels by the user application 162:

```
// Code below executes in the accelerator processor 150
main( ) {
 ...
  int in = OpenAndInitTLS(context, socket);
  int out = OpenAndInitTLS(context, socket);
  while(!TLSEof(in) && !TLSLastError(in) && !TLSLastError(out))
    kernel_clip_line(90, in, out);
  CloseTLS(in);
  CloseTLS(out);
}
// Code below (or functional equivalent) is synthesized as hardware
// and executes in the user kernel 169
void kernel_clip_line(int clip_value, int in, int out)
{
  char* buffer;
  tls_read(in, buffer, 1080);
  if(!buffer)
    return;
  char out_img[1080];
  for(int ii=0; ii < 1080; ++ii)
    out_img[ii] = min(buffer[ii], clip_value);
  tls_write(out, out_img, 1080);
}
```

Once the secure communications channel is established, the security layer 164 can be configured to provide session and connection information (referred to as "session information 172" herein as shown in FIG. 3C) to the session handler 167, the data router 163, and the crypto kernel 165 in the programmable hardware circuitry 156 via the interface component 166. Such session information 172 can include, for instance, a session identification, a session secret key, a cryptographic algorithm identification, a hash algorithm identification, a compression algorithm identification, or other suitable parameters or algorithm identifications. In certain embodiments, the security layer 164 can also be configured to indicate to the data router 163 whether data routing is to be performed for the established secure communications session.

The programmable hardware circuitry 156 can include various hardware circuits configurable by the user application 162 and/or security layer 164 executed by the accelerator processor 150 for performing various functions in hardware. For example, as shown in FIG. 3A, the programmable hardware circuitry 156 can include a I/O interface 161, a data router 163, a crypto kernel 165, a session handler 167, and a user kernel 169 operatively coupled to one another. In certain embodiments, the I/O interface 161 can include circuits configured to perform operations related to Media Access Control layer ("MAC") and TCP/IP layers. Example of such operations can include frame delimiting and recognition, addressing of destination stations, conveyance of source-station addressing information, transparent data transfer of logical link control, protection against errors by checking frame check sequences, and control of access to a physical transmission medium. In other embodiments, the I/O interface 161 can include only circuits configured to perform operations related to MAC layer but not the TCP/IP layer. In further embodiments, the I/O interface 161 can include other suitable circuits in addition to or in lieu of those related to MAC and/or TCP/IP layers.

The crypto kernel 165 can include circuits configured to perform encryption and/or decryption of certain data using an encryption key and according to a selected encryption algorithm, as well as random number generators, hashing engines, and other components suitable for symmetric or asymmetric cryptography. For example, the crypto kernel 165 can include circuits implementing triple Data Encryption Standard ("DES"), the RSA encryption algorithm, the Blowfish algorithm, the Advanced Encryption Standard ("AES"), or other suitable encryption algorithms. Even though the crypto kernel 165 is shown as being implemented in the programmable hardware circuitry 156, in other embodiments, the crypto kernel 165 may be implemented as a software component in the accelerator processor 150. In further embodiments, the crypto kernel 165 or components thereof can coexist in both the programmable hardware circuitry 156 and as a software component in the accelerator processor 150 to allow, for instance, execution of asymmetric cryptography operations for handshaking using the accelerator processor 150 and symmetric cryptography for data encryption/decryption using the programmable hardware circuitry 156. The security layer 164 and/or other components of the hardware accelerator 138 can utilize the crypto kernel 165 to encrypt/decrypt data via the interface component 166, as indicated by the arrow 159.

The user kernel 169 can include circuits implementing one or more application functions in hardware. In one example, the user kernel 169 can include circuits configured to perform transcoding of a video stream received via the underlay/overlay network 108 and 108'. In another example, the user kernel 169 can include circuits configured to perform lossy or non-lossy compression of a video stream. In other examples, the user kernel 169 can also include circuits configured to perform bit block transfers in graphics processing units, regular expression for spam control, artificial neural network training, or other suitable functions. The user kernel 169 typically can only process application data in a decrypted form. As such, during a secure communications session, such as a HTTPS session, the user kernel 169 may need to rely upon the accelerator processor 150 for decryption/encryption operations, according to certain implementations.

Relying on the accelerator processor 150 for encryption/decryption, however, can impose a constraint on data throughput of the hardware accelerator 138. For example, an amount of data traversing the communications bridge 158 can be up to four times for input data and four times for output data. Such data transfer imposes a constraint in the data throughput of the hardware accelerator 138. Thus, due to a high processing power demand, certain hardware acceleration systems may not be able to handle high speed transfers (e.g., >10 Gb/s). Also, using the accelerator processor 150 can be expensive, complex to integrate, and can demand a large device footprint, and consume a large amount of power. In addition, any data traversing the communications bridge 158 can be vulnerable in terms of security. For example, if any software running in the accelerator processor 150 is compromised, the flow of data from the hardware accelerator 138 to the accelerator processor 150 may be exposed.

Several embodiments of the disclosed technology can address at least some of the foregoing difficulties by implementing a data router 163 for switching data traffic between the accelerator processor 150 and the session handler 167 based on types of data carried by the secure data traffic. In certain embodiments, the data router 163 can assemble a TLS record 176 by aggregating the incoming packets 170 in order to be able to route data contained in the packets 170 at the TLS record level. For example, the data router 163 can be configured to switch the data traffic by monitoring a value in a header of the TLS record 176. When the header of the TLS record 176 contains a value (e.g., CHANGE_CIPHER_SPEC, ALERT, or HANDSHAKE) indicating that the TLS record 176 contains session management data, the data router 163 can be configured to forward the TLS record 176 to the interface component 166 of the accelerator processor 150 for further processing. On the other hand, when the header of the TLS record 176 contains a value (e.g., APPLICATION_DATA) indicating that the TLS record 176 contains encrypted application data, the data router 163 can route the TLS record 176 to the session handler 167 instead of the accelerator processor 150 for further processing, as described in more detail below with reference to FIGS. 4A-4C. One example data schema suitable for a header of the TLS record 176 is described in more detail below with reference to FIGS. 5A-5C.

In other embodiments, the data router 163 can be configured to detect establishment of the secure communications channel by, for example, monitoring for a server/client finished message or via other suitable techniques. Though the data router 163 is shown in FIG. 3A as a part of the programmable hardware circuitry 156, in other embodiments, the data router 163 may be a standalone hardware device, a software component provided by the accelerator processor 150, a combination thereof, or can have other suitable configurations. One example configuration for the data router 163 is described in more detail below with reference to FIG. 6.

The session handler 167 can be configured to transparently handle a subset of a security protocol. For example, the session handler 167 can be configured to transparently handle a subset of an SSL/TLS protocol such as a record layer sub-protocol (or a portion thereof) for processing application data. Using the session information 172 received from the accelerator processor 150, the session handler 167 can be configured to fragment/combine the received packets into a desired data structure, manage a sequence number of incoming and outgoing records, compress/decompress data in the TLS records 176 using the compression algorithm negotiated during handshake, or perform other suitable data operations. In a particular example, the session handler 167 can be configured to decrypt a data stream related to a video stream and forward the decrypted data stream to the user kernel 169 for further processing, as described in more detail below with reference to FIGS. 4A-4C. One example configuration for the session handler 167 is described in more detail below with reference to FIG. 7.

FIGS. 3A-3C illustrate certain operation stages during initial establishment of a secure communications channel in accordance with embodiments of the disclosed technology. As shown in FIG. 3A, when the I/O interface 161 receives packets 170, in certain embodiments, the I/O interface 161 can forward the packets 170 to the data router 163 for assembling and routing at TLS record level. In other embodiments, the I/O interface 161 can be configured to assemble the packets 170 into one or more TLS records 176. The data router 163 can then determine whether the TLS record 176 assembled from the packets 170 contains application data or non-application data, such as session management data. In response to determining that the packets 170 do not contain application data, the data router 163 can be configured to forward or otherwise route the TLS record 176 to the interface component 166 of the accelerator processor 150 via the communications bridge 158, as shown in FIG. 3A.

The interface component 166 can then forward the TLS record 176 to the security layer 164 and/or the user application 162 via the interface component 166 for further processing. In certain embodiments, the security layer 164 can utilize the crypto kernel 165 in the programmable hardware circuitry 156 to perform certain encryption/decryption operations on, for example, a payload of the TLS record 176 containing session control data, as indicated by the arrow 159. The security layer 164 can then access the SSL/TLS library 154 and generate additional TLS records 176' as responses to the session management data included in the TLS record 176, as shown in FIG. 3B. The interface component 166 can then transmit the TLS records 176' to the data router 163 and/or the I/O interface 161 at the programmable hardware circuitry 156, which in turn can format or otherwise manipulate the TLS records 176' into packets 171 and transmit the packets 171 to the peer computing device via the overlay/underlay network 108' and 108 of FIG. 1.

The foregoing operations shown in FIG. 3B can be repeated one or more times until a secure communications channel is established. As shown in FIG. 3C, upon establishment of the secure communications channel, the user application 162 and/or the security layer 164 can transmit session information 172 to the session handler 167 to configure the session handler 167 for handling the established secure communications session. The session information 172 can include, for instance, a session identification, a connection identification, a session secret key, a cryptographic algorithm identification, a hash algorithm identification, a compression algorithm identification, or other suitable parameters or algorithm identifications. In certain embodiments, the user application 162 and/or the security layer 164 can also transmit the session information 172 to the data router 163 indicating to the data router 163 whether to route other packets containing application data related to the secure communications channel. In further embodiments, the session information 172 can be transmitted to the crypto kernel 165, to setup an agreed upon encryption algorithm and encryption keys for use to encode or decode data traffic. In yet further embodiments, the session handler 167 and/or the router 163 can relay the foregoing information to the crypto kernel 165.

Figure 4A:
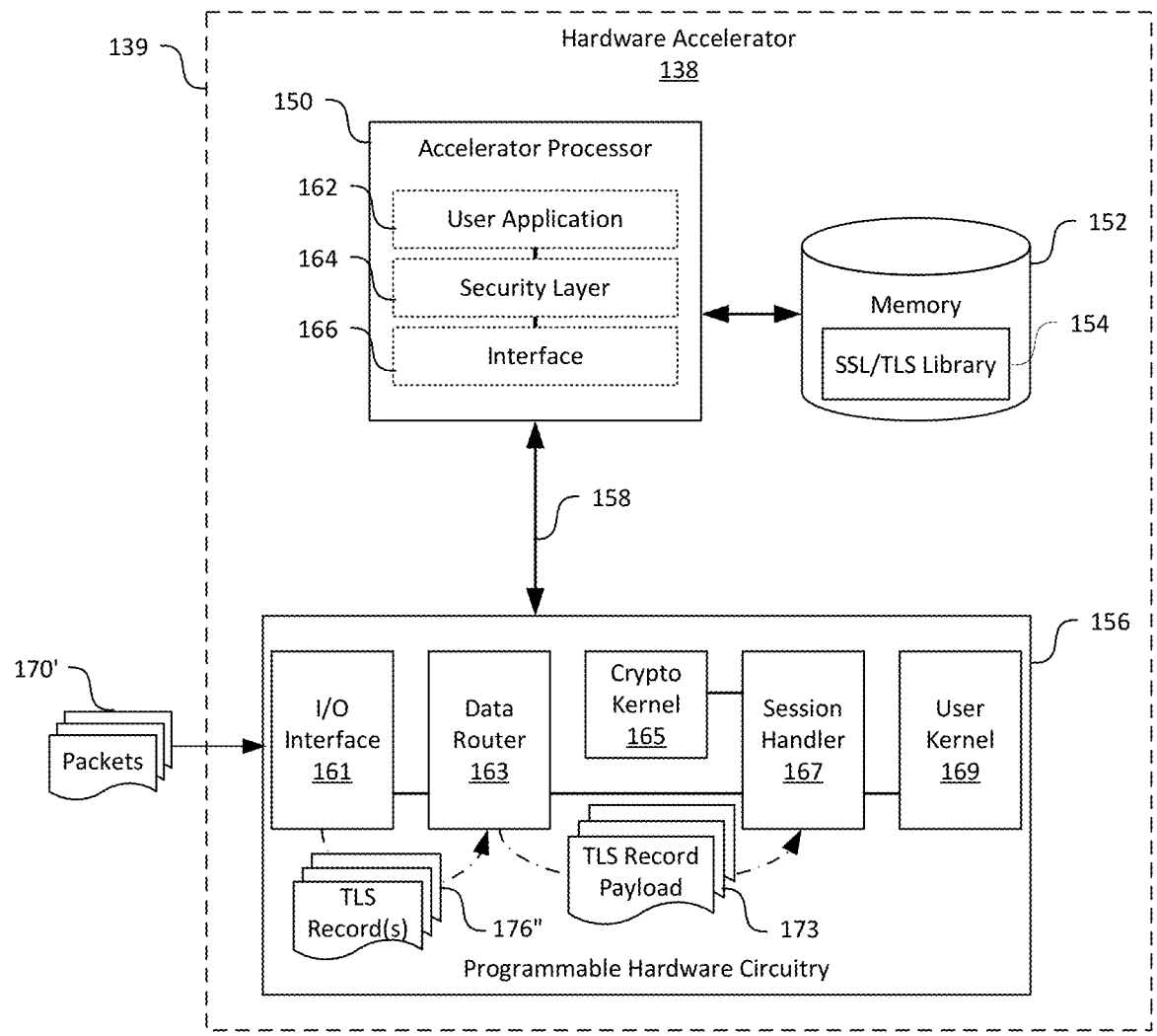
FIGS. 4A-4C are schematic diagrams illustrating certain hardware/software components of a hardware accelerator in FIG. 2 during application data processing in accordance with embodiments of the disclosed technology.
Figure 4B:
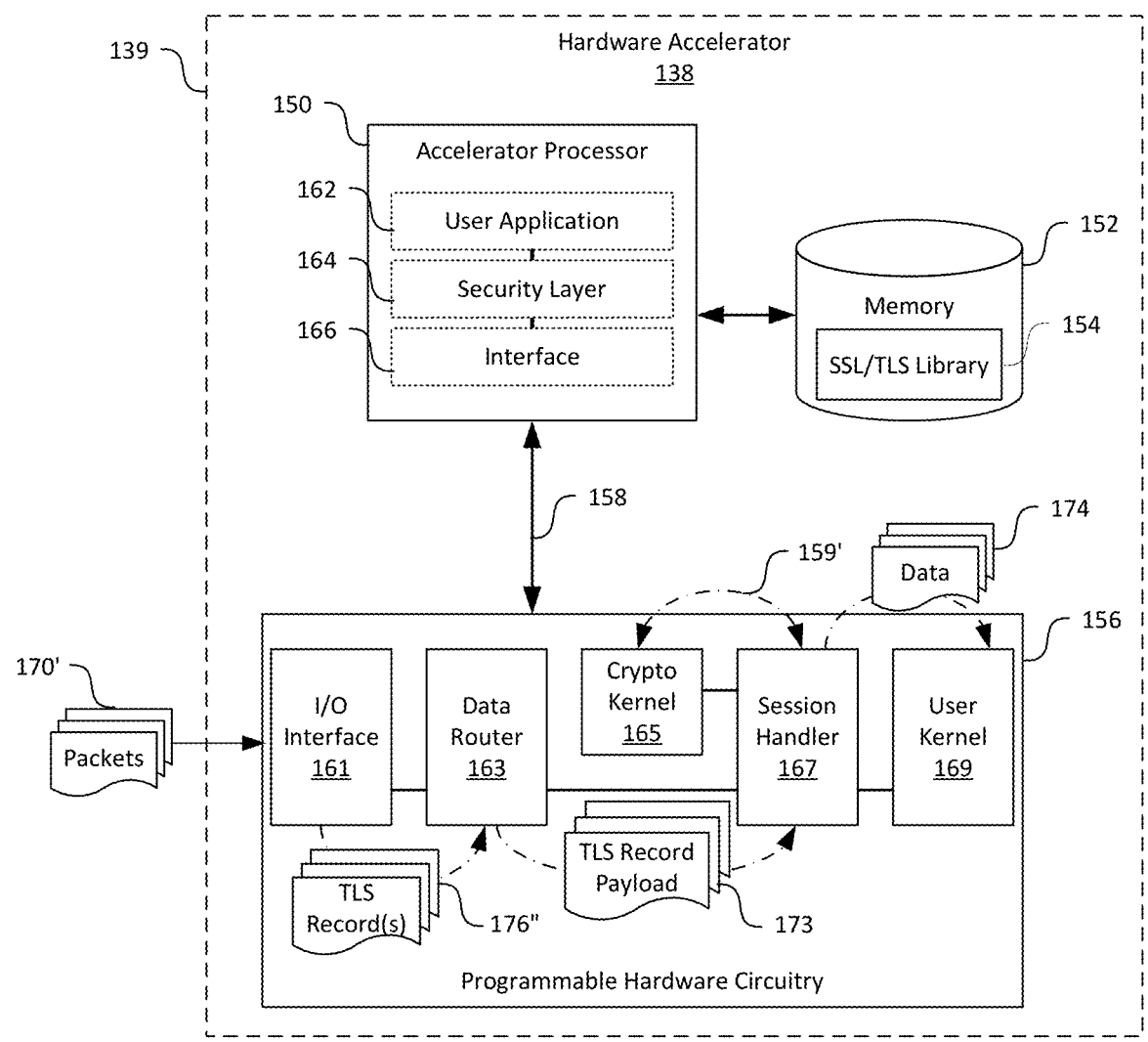
Figure 4C:
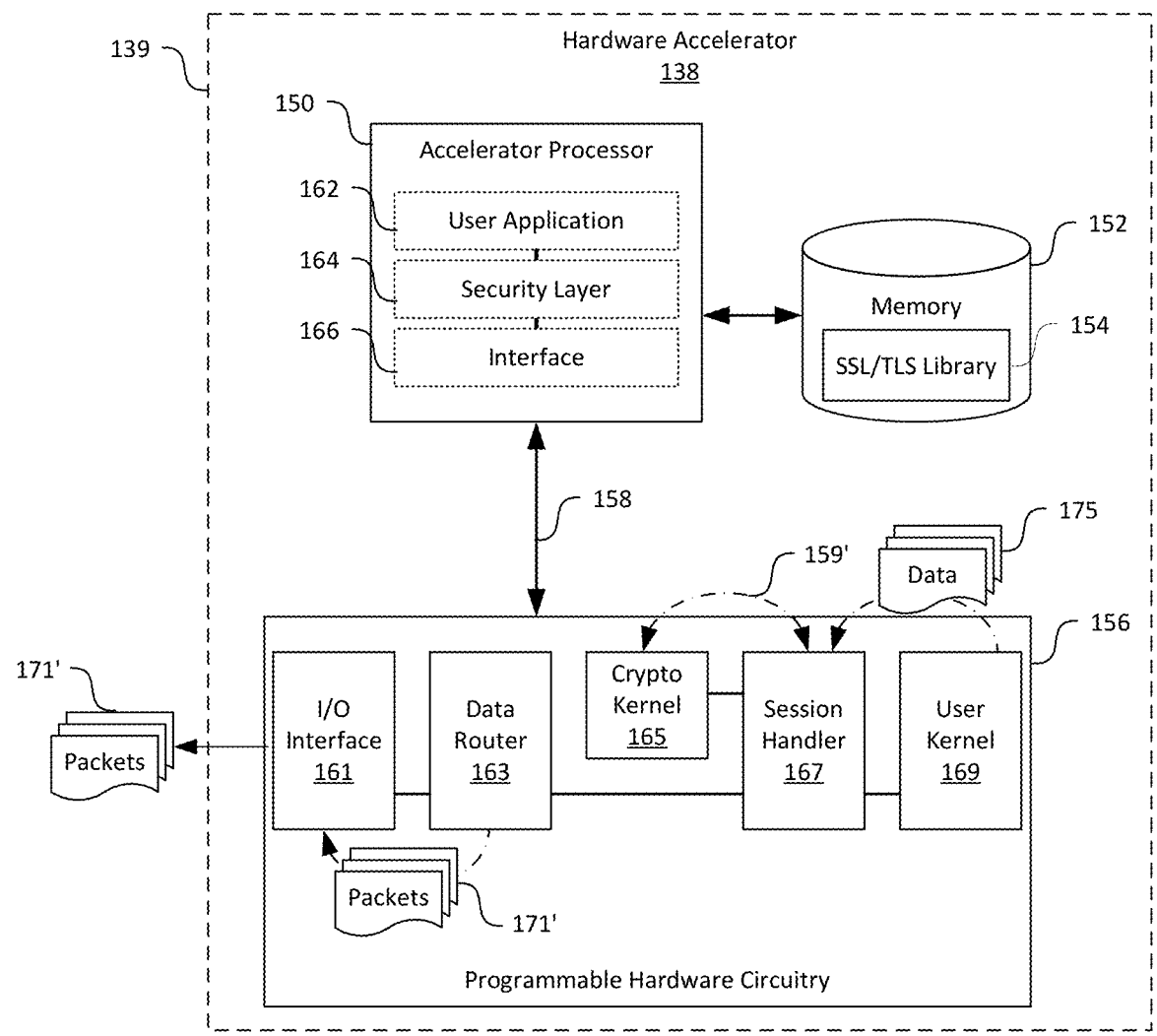

Upon receiving the session information 172, the data router 163, the crypto kernel 165, and the session handler 167 can cooperate to process a payload of TLS record 176 from assembled packets 170' containing application data that is either generated or consumed by the user kernel 169, as shown in FIGS. 4A-4C. As shown in FIG. 4A, the I/O interface 161 can receive packets 170' and assemble the packets 170' into TLS records 176" and forward the received TLS records 176 to the data router 163 for routing. In other embodiments, the I/O interface 161 can directly forward the received packets 170' to the data router 163 for assembly into the TLS records 176".

In turn, the data router 163 can determine whether the assembled TLS records 176" contain application data for the secure communications channel. In certain implementations, each TCP/IP connection can be uniquely identified by a combination of IP address and ports of corresponding endpoints, and assigned a connection ID. The accelerator processor 150 can update a routing table (not shown) in the data router 163, indicating which connection IDs belong to hardware-accelerated SSL/TLS connections. When the incoming packets 171' with an associated connection ID that matches one of the entries present in the routing table, the data router 163 can queue the packets 170', assemble the packets 170' into the TLS records 176" (if not already assembled by the I/O interface 161), extract a TLS record header, and then based on the TLS record header to mark whether a corresponding TLS records 176" is associated with application data.

In response to determining that the TLS records 176" contains application data, the data router 163 can strip the TLS record header from the TLS records 176" to generate the TLS record payload 173 and route the TLS record payload 173 to the session handler 167 instead of routing the entire TLS records 176" to the interface component 166 of the accelerator processor 150. As shown in FIG. 4B, the session handler 167 can then cooperate with the crypto kernel 165 (as indicated by the arrow 159') to extract the application data 174 by decrypting the received TLS record payload 173. The session handler 167 can also fragment/combine, compress/decompress, or perform other suitable operations on the decrypted application data 174.

The session handler 167 can then provide the decrypted application data 174 to the user kernel 169 for processing according to configuration of the user kernel 169. In one example, the user kernel 169 can perform transcoding on the received application data 174. In another example, the user kernel 169 can clip pixels of the received application data 174. In further examples, the user kernel 169 can perform other suitable operations on the received application data 174 to generate additional application data 175, as shown in FIG. 4C. The session handler 167 can then cooperate with the crypto kernel 165 to encrypt the additional application data 175 or perform other suitable operations before the I/O interface 161 transmits additional packets 171' to the peer computing device.

Several embodiments of the disclosed technology can thus reduce or even prevent overloading the communications bridge 158 between the programmable hardware circuitry 156 and the accelerator processor 150. As described above with reference to FIGS. 3A-4C, by implementing the session handler 167 in the programmable hardware circuitry 156 to handle application data processing, encryption/decryption of any application data 174 in a data stream would not leave the programmable hardware circuitry 156 and cross the communications bridge 158 to the accelerator processor 150. Thus, from the perceive of the accelerator processor 150, the secure communications session appears as if never receiving any data, yet the communications session is valid. From the perspective of the programmable hardware circuitry 156, the secure communications session appears as if a secured connection is initiated without any handshaking overhead. As such, overhead in terms of data transfer over the communications bridge 158 can be reduced to enable higher throughput (e.g., greater than 10 gigabit/second) at the hardware accelerator 138 when compared to other hardware accelerators.

Figure 5A:
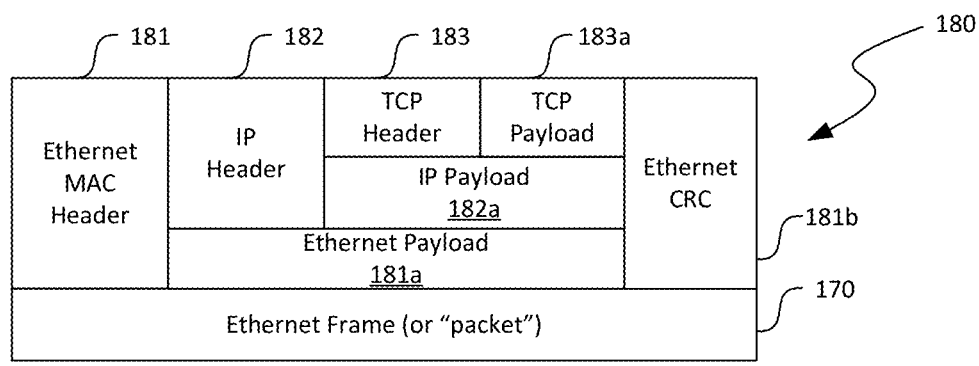
FIGS. 5A-5C are schematic diagrams illustrating a data schema suitable for a packet in accordance with embodiments of the disclosed technology.
Figure 5B:
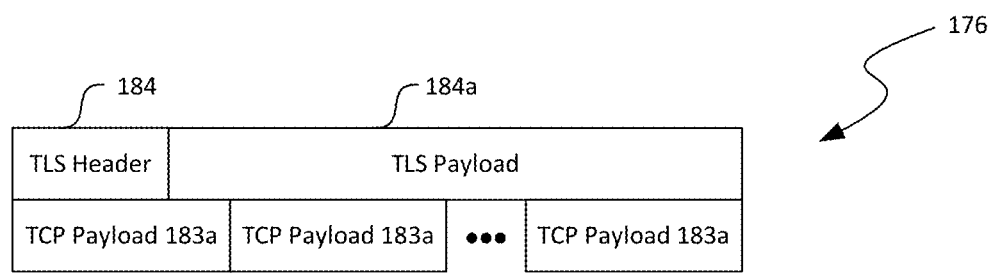
Figure 5C:
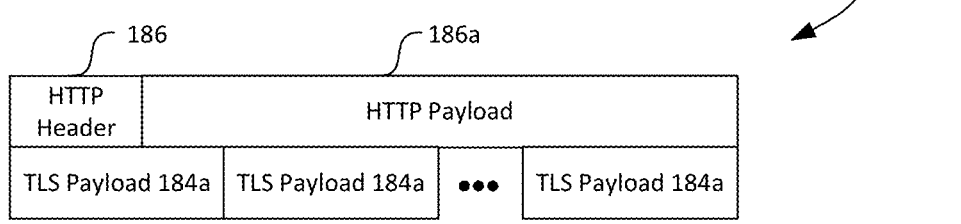

FIG. 5A is a schematic diagram illustrating a data schema 180 suitable for a packet 170 in accordance with embodiments of the disclosed technology. As shown in FIG. 5A, the data schema 180 can include layered protocol records each having a header and a payload. For example, the packet 170 can include an Ethernet record having a MAC header field 181, a payload 181a, and an Ethernet cyclic redundancy check field 181b. The Ethernet payload 181a can in turn contain an IP header field 182 and an IP payload 182a. As shown in FIG. 5A, the IP payload 182a can further contain a TCP header field 183 and a TCP payload 183a. As shown in FIG. 5B, TLS records 176 each containing a TLS record header 184 and a TLS payload 184a can be encoded in one or more consecutive TCP payloads 183a. In turn, as shown in FIG. 5C, one or more consecutive TLS record payloads 184a can contain one or more encoded HTTP records 185 each with a HTTP header field 186 and a HTTP payload 186a because a size of the HTTP records 185 can be larger than a size of a single TLS record payload 184a.

The MAC header field 181, the IP header field 182, and the TCP header field 183 can be configured to contain a MAC address, an IP address, and a TCP port number for the TCP/IP connection to the hardware accelerator 138 (FIG. 2) and/or the host 106 (FIG. 2), respectively. The TLS header field 184 can be configured to contain a value indicating a type of data contained in TLS records 176. Example values for the TLS header field 184 can include APPLICATION_DATA, CHANGE_CIPHER_SPEC, ALERT, or HANDSHAKE. The HTTP header field 186 can be configured to contain various parameters according to the HTTP protocol. For example, the parameters can include a content length of the data in the HTTP payload field 186a, cache control, etc. Even though the example data schema 180 includes the HTTP header field 186 and HTTP payload 186a, in other embodiments, the data schema 180 can also include Secure Shell ("SSH"), Secure Copy ("SCP"), Secure File Transfer Protocol ("SFTP"), or other suitable protocols encapsulated under SSL/TLS.

Figure 6:
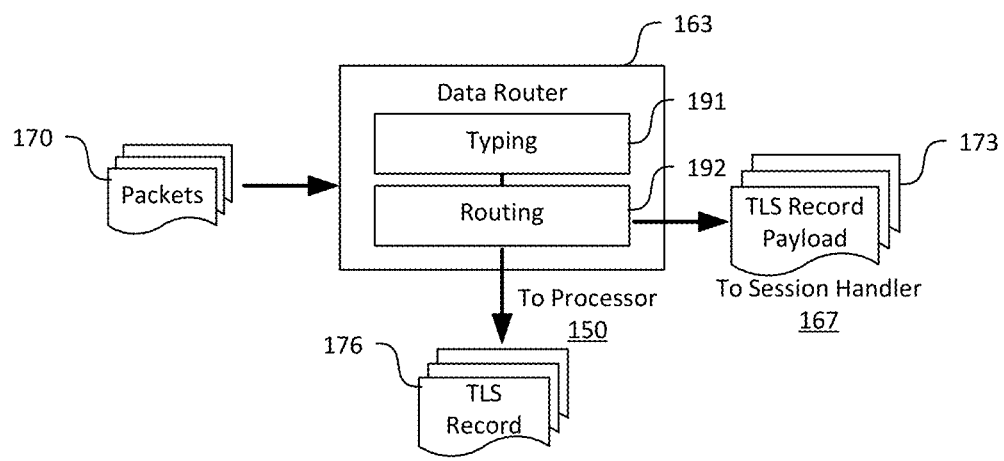
FIGS. 6 and 7 are schematic diagram illustrating certain hardware/software components of a data router and a session handler, respectively, in accordance with additional embodiments of the disclosed technology.
Figure 7:
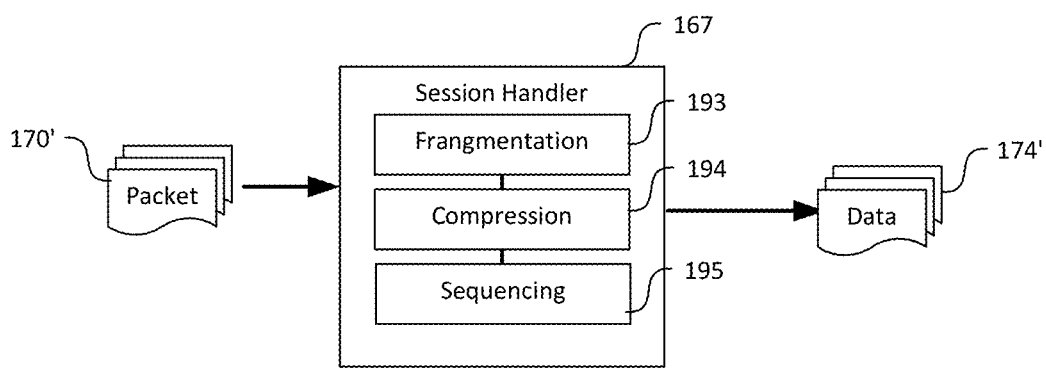

FIGS. 6 and 7 are schematic diagram illustrating certain hardware/software components of a data router 163 and a session handler 167, respectively, in accordance with additional embodiments of the disclosed technology. As shown in FIG. 6, the data router 163 can include a typing circuit 191 and a routing circuit 192 operatively coupled to one another. The typing circuit 191 can be configured to assemble a TLS record 176 from data in incoming packets 170 and analyze the header content of the assembled TLS record 176 to determine a type of the assembled TLS record 176. As discussed above with reference to FIGS. 3A-4C, in certain embodiments, the typing circuit 191 can be configured to determine a type (e.g., application date or non-application data) of the TLS record 176 by monitoring a TLS record header 184 (FIG. 5B) of the TLS record 176. In other embodiments, the typing circuit 191 may detect the type of the TLS record 176 using other suitable techniques. The routing circuit 192 is configured to forward the TLS record 176 to either the session handler 167 (FIG. 3A) or the accelerator processor 150 (FIG. 3A) based on the type determined by the typing circuit 191.

As shown in FIG. 7, the session handler 167 can include a fragmentation circuit 193, a compression circuit 194, and a sequencing circuit 195 operatively coupled to one another to generate application data 174'. The fragmentation circuit 193 can be configured to fragment or combine data contained in the packets 170'. The compression circuit 194 can be configured to compress or decompress data contained in the packets 170'. The sequencing circuit 195 can be configured to monitor a sequence number associated with the packet 170 and/or modify the sequence number to so that the packet 170 can be acceptable by the accelerator processor 150 (FIG. 4A). In one example, the sequencing circuit 195 can be configured to track sequence numbers of previous packets containing session management messages processed by the accelerator processor 150. The sequencing circuit 195 can then modify the sequence number of the packet 170 such that the packet 170 appears to be consecutive to the previous packets containing session management messages.

Figure 8A:
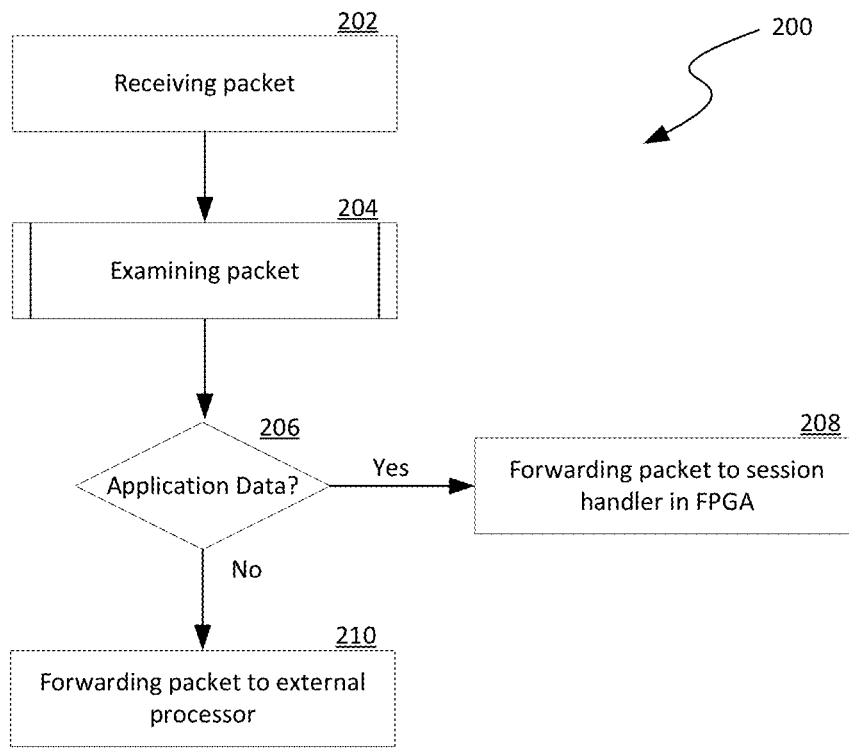
FIGS. 8A-9 are flowcharts illustrating various aspects of secure communication management in hardware accelerators in accordance with embodiments of the disclosed technology.
Figure 8B:
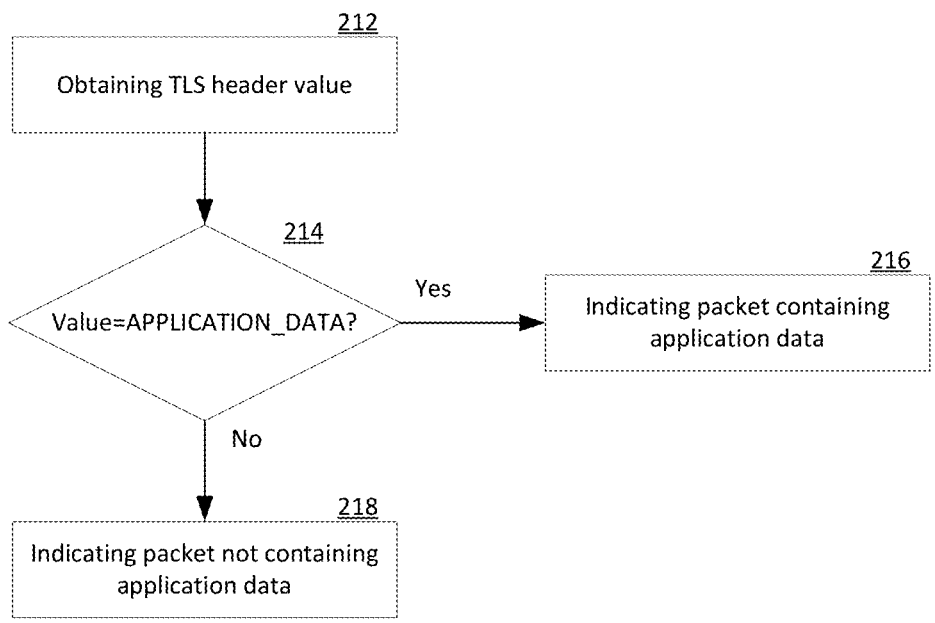
Figure 9:
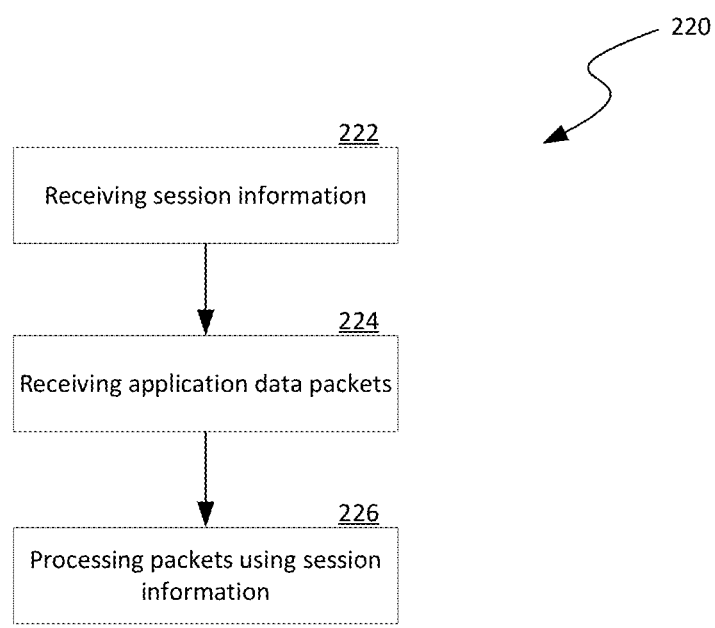

FIGS. 8A-9 are flowcharts illustrating various aspects of secure communication management in hardware accelerators in accordance with embodiments of the disclosed technology. Even though the processes are described below with reference to the distributed computing system 100 of FIG. 1, in other embodiments, the processes may be implemented in other suitable computing systems with additional and/or different components.

As shown in FIG. 8A, a process 200 can include receiving a packet at stage 202. The received packet can include one or more headers, as such those shown in FIG. 5, or contain other suitable information. The process 200 can then include examining the packet to determine whether the packet contains a TLS record with encrypted application data at stage 204. In certain embodiments, examining the packet can include determining whether a value contained in a TLS record header of the TLS record equals to APPLICATION_DATA, example operations of which are described in more detail below with reference to FIG. 8B. In other embodiments, examining the packet can also include queuing the packet, assembling the packet with other packets into the TLS record, and extracting the TLS record header from the assembled TLS record.

The process 200 can then include a decision stage 206 to determine whether the packet contains a TLS record with application data. In response to determining that the packet contains a TLS record with application data, the process 200 can include forwarding the TLS record to a session handler implemented in the programmable hardware circuitry 156 (e.g., a FPGA) for further processing at stage 208. In response to determining that the packet does not contain application data, the process 200 can include forwarding the TLS record to an accelerator processor for further processing at stage 210.

FIG. 8B is a flowchart illustrating example operations of examining a received packet. As shown in FIG. 8B, the operations can include obtaining a TLS record header value of the packet by, for example, parsing the TLS record, at stage 212. The operations can then include a decision stage 214 to determine whether the obtained TLS header value equals to APPLICATION_DATA. In response to determining that the obtained TLS header value equals to APPLICATION_DATA, the operations can include indicating that the packet contains a TLS record with application data at stage 216. In response to determining that the obtained TLS header value does not equal to APPLICATION_DATA, the operations can include indicating that the packet does not contain a TLS record with application data at stage 218.

FIG. 9 is a flowchart illustrating a process 220 of processing a packet at a session handler implemented in, for example, the programmable hardware circuitry 156 of FIG. 3A. As shown in FIG. 9, the process 220 can include receiving session information at stage 222. The session information can include one or more of a session identification, a session secret key, a cryptographic algorithm, a hash algorithm, or a compression algorithm of a secure communications session related to the packet. The process 220 can then include receiving packets containing application data at stage 224. The process 220 can further include processing the received packets containing a TLS record with application data using the received session information at stage 226. In certain embodiments, processing the received packets can include decrypt a payload of the TLS record, fragmenting or combining the application data into a target data structure, numbering a sequence of data blocks in the application data, or compressing or decompressing the application data contained in the received packets using the compression algorithm identified in the received session information.

Figure 10:
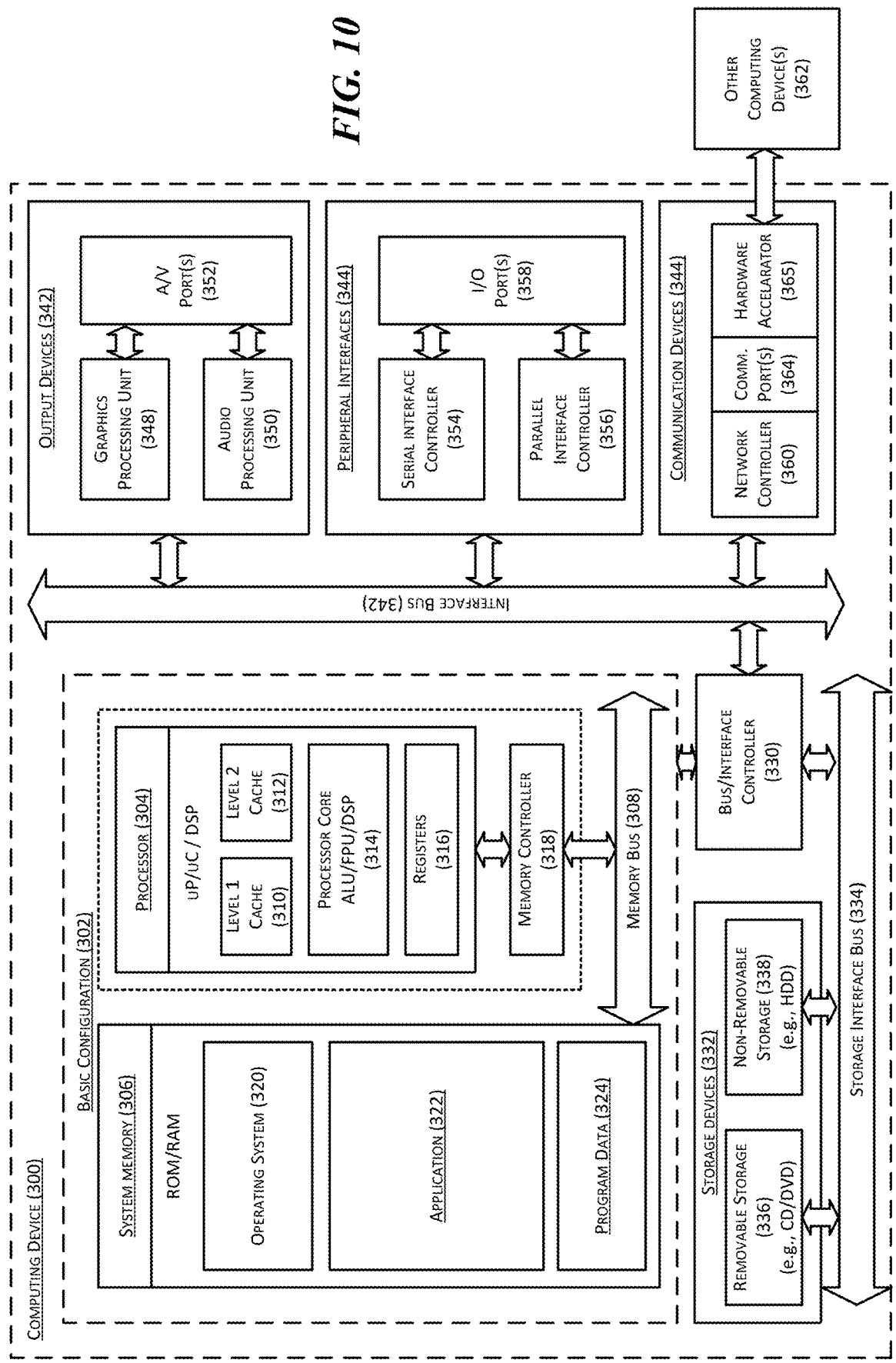
FIG. 10 is a computing device suitable for certain components of the distributed computing system in FIG. 1.

FIG. 10 is a computing device 300 suitable for certain components of the hybrid cloud computing system 100 in FIG. 1. For example, the computing device 300 can be suitable for the hosts 106 or the client devices 102 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated or other types of signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360 and a hardware accelerator 365, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of facilitating secure communication management in a hardware accelerator containing a programmable hardware circuitry having a user kernel and coupled to an accelerator processor external and connected to the programmable hardware circuitry via a communications bridge, wherein the method comprising:

at the programmable hardware circuitry,
receiving one or more data packets representing a Transport Layer Security ("TLS") record;
examining a header value of the TLS record to determine whether the TLS record or a part thereof contains application data related to a user application;
in response to determining that the TLS record does not contain application data, forwarding the TLS record to the accelerator processor via the communications bridge for further processing; and
in response to determining that the TLS record contains application data, extracting application data from the TLS record and processing the application data extracted from the TLS record according to a security protocol using the user kernel to generate a target data stream without transmitting the TLS record or a portion thereof to the accelerator processor via the communications bridge, thereby reducing a consumption of communications bandwidth across the communications bridge.

2. The method of claim 1, further comprising:
executing instructions, at the accelerator processor, to establish a secure communications channel having corresponding session information including one or more of a session identification, a connection identification, a session secret key, a cryptographic algorithm, a hash algorithm, or a compression algorithm related to the TLS record; and
transmitting, from the accelerator processor, to the programmable hardware circuitry via the communications bridge, data representing the session information of the established secure communications channel.

3. The method of claim 1, further comprising:
executing instructions, at the accelerator processor, to establish a secure communications channel with corresponding session information including one or more of a session identification, a connection identification, a session secret key, a cryptographic algorithm, a hash algorithm, or a compression algorithm related to the TLC record; and
transmitting, from the accelerator processor, to the programmable hardware circuitry via the communications bridge,
data representing the session information of the established secure communications channel; and
an indication that processing of any application data related to the established secure communications channel is to be handled by the programmable hardware circuitry.

4. The method of claim 1, further comprising executing instructions, at the accelerator processor, to establish a secure communications channel with a peer computing device by performing one or more of:
negotiation of cipher suites;
authentication of the peer computing device;
exchange of random numbers and a pre-master secret; or
creation of a shared secret key.

5. The method of claim 1, further comprising:
receiving, at the programmable hardware circuitry, data representing session information from the accelerator processor via the communications bridge, the session information being related to a secure communications channel and including data representing one or more of a session identification, a connection identification, a session secret key, a cryptographic algorithm, a hash algorithm, or a compression algorithm related to the TLC record; and
wherein processing the TLS record includes processing the TLS record to extract the application data from the TLS record at the programmable hardware circuitry using the session information received from the accelerator processor.

6. The method of claim 1, further comprising:
receiving, at the programmable hardware circuitry, data representing session information from the accelerator processor via the communications bridge, the session information including data representing one or more of a session identification, a session secret key, a cryptographic algorithm, a hash algorithm, or a compression algorithm related to the TLS record; and
wherein processing the TLS record includes using the session information received from the accelerator processor to perform one or more of:
fragmenting or combining the application data into a target data structure;
numbering a sequence of data blocks in the application data; or
compressing or decompressing the application data contained in the TLS record using the compression algorithm identified in the received session information.

7. The method of claim 1, further comprising:
receiving, at the programmable hardware circuitry, from the accelerator processor via the communications bridge, data representing an indication that processing of any application data related to a secure communications channel is to be handled by the programmable hardware circuitry;
upon receiving the one or more data packets representing the TLS record,
determining whether data in the TLS record belongs to a session or a connection of the secure communications channel; and
in response to determining that the data in the TLS record belongs to a session or a connection of the secure communications channel, examining, at the programmable hardware circuitry, the TLS record to determine whether a payload in the TLS record contains application data.

8. The method of claim 1 wherein examining the TLS record includes:
extracting, at the programmable hardware circuitry, a TLS record header contained in the TLS record;
upon determining that the extracted TLS record header contains a value of APPLICATION_DATA, indicating that the TLS record contains application data; and
upon determining that the extracted TLS header contains a value other than APPLICATION_DATA, indicating that the TLS record does not contain application data.

9. A hardware accelerator, comprising:
a field programmable gate array ("FPGA") having a synthesized user kernel;
an accelerator processor external to the FPGA, the accelerator processor being coupled to the FPGA via a communications bridge; and
a memory containing instructions executable by the accelerator processor to cause the accelerator processor to:
receive messages forwarded by the FPGA via the communications bridge upon the FPGA determining that the received messages contain session management data by inspecting a header value of the received messages, the received messages containing the session management data related to a secure communications channel from a peer computing device;

upon receiving the messages, establish the secure communications channel of a session or a connection with the peer computing device using the session management data included in the received messages; and upon establishing the secure communications channel, configure the FPGA with data representing one or more of a session identification, a connection identification, a session secret key, a cryptographic algorithm, a hash algorithm, or a compression algorithm to be used for the secure communications channel, thereby allowing the FPGA to, upon determining that additional messages contain application data, extract the application data of the secure communications channel from the additional messages and process the extracted application data using the user kernel to generate a target data stream without forwarding the additional messages to the accelerator processor.

10. The hardware accelerator of claim 9 wherein the memory contains additional instructions executable by the accelerator processor to cause the accelerator processor to indicate to the FPGA that the additional messages containing the application data of the secure communications channel are to be processed by the FPGA upon establishing the secure communications channel.

11. The hardware accelerator of claim 9 wherein the memory contains additional instructions executable by the accelerator processor to cause the accelerator processor to:
  indicate to the FPGA that the additional messages containing the application data of the secure communications channel are to be processed by the FPGA upon establishing the secure communications channel; and
  upon a completion of configuring the FPGA to process the additional messages containing application data of the secure communications channel, receive no messages containing application data of the secure communications channel as if no application data is exchanged via the secure communications channel.

12. The hardware accelerator of claim 9 wherein the memory contains additional instructions executable by the accelerator processor to cause the accelerator processor to:
  subsequent to establishing the secure communications channel,
    receive other messages containing additional session management data from the peer computing device, the additional session management data representing a request by the peer computing device to re-negotiate at least one of the session identification, the session secret key, the cryptographic algorithm, the hash algorithm, or the compression algorithm to be used for the secure communications channel; and
    upon receiving the additional messages, re-negotiating with the peer computing device to update at least one of the session identification, the session secret key, the cryptographic algorithm, the hash algorithm, or the compression algorithm.

13. The hardware accelerator of claim 9 wherein the memory contains additional instructions executable by the accelerator processor to cause the accelerator processor to:
  subsequent to establishing the secure communications channel,
    receive other messages containing additional session management data from the peer computing device, the additional session management data representing a request by the peer computing device to re-negotiate at least one of the session identification, the session secret key, the cryptographic algorithm, the hash algorithm, or the compression algorithm to be used for the secure communications channel; and
    upon receiving the additional messages, re-negotiating with the peer computing device to update at least one of the session identification, the session secret key, the cryptographic algorithm, the hash algorithm, or the compression algorithm; and
    re-configure the FPGA with the updated at least one of the session identification, the session secret key, the cryptographic algorithm, the hash algorithm, or the compression algorithm.

14. A method of facilitating secure communication management in a hardware accelerator containing a field programmable gate array ("FPGA") having a user kernel and coupled to an accelerator processor external to the FPGA via a communications bridge, wherein the method comprising:
  at the FPGA,
    receiving messages from a peer computing device via a computer network;
    examining a header value of data contain in each of the received messages to determine whether the received messages contain application data related to a secure communications channel, wherein the received messages include a first subset that does not contain application data related to the secure communications channel and a second subset that contains application data related to the secure communications channel;
    forwarding the first subset of the received messages to the accelerator processor via the communications bridge for further processing; and
    processing the second subset of the received messages to extract application data from the second subset of the received messages and process the extracted application data according to a security protocol using the user kernel to generate a target data stream without forwarding the second subset of the received messages to the accelerator processor via the communications bridge, thereby reducing a consumption of bandwidth across the communications bridge.

15. The method of claim 14, further comprising:
  receiving, at the FPGA, data representing session information of the secure communications channel from the accelerator processor via the communications bridge, the session information including one or more of a session identification, a connection identification, a session secret key, a cryptographic algorithm, a hash algorithm, or a compression algorithm; and
  wherein processing the second subsets of the received messages includes processing the second subsets of the received messages to extract the application data from the messages using the session information received from the accelerator processor.

16. The method of claim 14, further comprising:
  receiving, at the FPGA, data representing session information of the secure communications channel from the accelerator processor via the communications bridge, the session information including one or more of a session identification, a connection identification, a session secret key, a cryptographic algorithm, a hash algorithm, or a compression algorithm; and wherein processing the second subsets of the received messages includes using the session information received from the accelerator processor to perform one or more of:
- fragmenting or combining the application data into a target data structure;
- modifying a sequence number in a header of the individual messages; or
- compressing or decompressing the application data contained in the second subset of the received messages using the compression algorithm identified in the received session information.

17. The method of claim 14, further comprising:
receiving, at the FPGA, from the accelerator processor via the communications bridge, data representing an indication that processing of any application data related to the secure communications channel is to be handled by the FPGA;
upon receiving the messages,
- determining whether each of the received messages belongs to a connection associated the secure communications channel; and
- in response to determining that one of the messages belongs to the connection associated with the secure communications channel, determining whether the one of the received messages contains application data.

18. The method of claim 14 wherein the messages individually includes a Transport Layer Security ("TLS") record having a TLS record header and a TLS payload, and wherein examining the data in each of the received messages includes:
- examining, at the programmable hardware circuitry, the TLS record header contained in the individual TLS records;
- upon determining that the TLS record header of one of the TLS records contains a value other than APPLICATION_DATA, indicating that the TLS record belongs to the first subset; and
- upon determining that the TLS record header of one of the TLS records contains a value of APPLICATION_DATA, indicating that the TLS record belongs to the second subset.

19. The method of claim 14, further comprising:
receiving, at the FPGA, data representing a list of one or more connections associated with a secure communications session;
prior to examining the data contained in each of the received messages, determining whether the received messages are associated with one or more of the connections associated with a secure communications session; and
- in response to determining that the received messages are associated with a connection associated with a secure communications channel, proceeding to examining the data contain in each of the received messages.

* * * * *